(12) United States Patent
Liardet et al.

(10) Patent No.: US 8,958,556 B2
(45) Date of Patent: Feb. 17, 2015

(54) METHOD OF SECURE CRYPTOGRAPHIC CALCULATION, IN PARTICULAR, AGAINST ATTACKS OF THE DFA AND UNIDIRECTIONAL TYPE, AND CORRESPONDING COMPONENT

(75) Inventors: Pierre Yvan Liardet, Peynier (FR); Fabrice Romain, Rians (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 268 days.

(21) Appl. No.: 13/441,180

(22) Filed: Apr. 6, 2012

(65) Prior Publication Data
US 2012/0257747 A1    Oct. 11, 2012

(30) Foreign Application Priority Data

Apr. 8, 2011    (FR) ...................................... 11 01091
Oct. 21, 2011   (EP) ...................................... 11306360

(51) Int. Cl.
*H04L 9/00*    (2006.01)
(52) U.S. Cl.
USPC ........................................................... 380/46
(58) Field of Classification Search
USPC ............................................ 380/28, 46, 252
See application file for complete search history.

(56) References Cited

U.S. PATENT DOCUMENTS

2011/0055591 A1*   3/2011   Rivain et al. .................. 713/189
2011/0129084 A1*   6/2011   Fumaroli et al. ................ 380/28

FOREIGN PATENT DOCUMENTS

WO          02063821          8/2002

OTHER PUBLICATIONS

Kamal et al., "An FPGA implementation of AES with fault analysis countermeasures", 2009 International Conference on Microelectronics, Dec. 2009, pp. 217-220.

* cited by examiner

*Primary Examiner* — Anthony Brown
(74) *Attorney, Agent, or Firm* — Allen, Dyer, Doppelt, Milbrath & Gilchrist, P.A.

(57) ABSTRACT

A method of secure cryptographic calculation includes formulating a first list of first random quantities, formulating a first non-linear substitution operator masked with at least part of the first list, and formulating a second list determined from the first list. The second list includes second random quantities respectively determined from the first random quantities. A second non-linear substitution operator masked with at least part of the second list is formulated. At least two successive implementations of a cryptographic calculation algorithm are performed that includes N rounds of calculations carried out successively to obtain output data based on input data and of a secret key, with a data path of the cryptographic calculation algorithm being masked.

22 Claims, 4 Drawing Sheets

METHOD OF SECURE CRYPTOGRAPHIC CALCULATION, IN PARTICULAR, AGAINST ATTACKS OF THE DFA AND UNIDIRECTIONAL TYPE, AND CORRESPONDING COMPONENT

FIELD OF THE INVENTION

The present invention relates to a secure method of cryptographic calculation employing a secret or private key, and to a component implementing such a secure method.

In particular, but not exclusively, the following algorithms may be implemented: the DES or AES algorithm, a cryptographic calculation algorithm exhibiting the 1-complement property of DES, such as, for example, an algorithm based on a Feistel network.

BACKGROUND OF THE INVENTION

A Feistel algorithm performs a block symmetric encryption and is characterized, in particular, by similar or indeed identical encryption and decryption operations. An exemplary Feistel algorithm is the DES algorithm and its diverse variations. Other algorithms are known by the names LOKI and GHOST.

The components used to implement a secure method relate to, in particular, applications where access to services and/or to data is severely controlled. These components usually have an architecture formed around a microprocessor and a program memory comprising, in particular, the secret key.

Such components are, for example, used in chip cards. In particular, these components may be used for banking type applications by way of a control terminal or remotely. Such components use one or more methods of encipherment employing a secret or private key to calculate output data on the basis of input data. Such a method is, for example, used to encrypt, decrypt, sign an input message or else verify the signature of the input message.

To ensure the security of transactions, secret or private key encipherment methods are constructed so that it is not possible to determine the secret key used on the basis of the knowledge of the input data and/or of the output data of the algorithm. However, the security of a component relies on its ability to keep hidden the secret key that it uses.

A frequently used method is the DES (Data Encryption Standard) type method. It makes it possible, for example, to provide an encrypted message MS (or output data) coded on 64 bits, on the basis of a plaintext message ME (input data) also coded on 64 bits and of a 56-bit secret key K0.

The algorithm of the DES type is well known to the person skilled in the art. The latter may refer, for example, for all useful purposes to the document entitled DATA ENCRYPTION STANDARD (DES), FIPS PUB 46-3, FEDERAL INFORMATION PROCESSING STANDARDS PUBLICATION, 25 Oct. 1999, U.S. DEPARTMENT OF COMMERCE, National Institute of Standards and Technology.

Various types of attacks on an implementation (of DES, for example) of a cryptography algorithm are possible. An attack of the DFA (Differential Fault Analysis) type may be cited. This type of attack has formed the subject of several publications. It is, in particular, possible to refer to the article by Shamir and Biham entitled "Differential Fault Analysis of Secret Key Cryptosystems", lecture note in computer science, 1294: pages 513-525, 1997.

A DFA attack uses fault injection, for example, by way of a laser ray, so as to reach one or more bits of a temporary result of the calculation in a register so as to modify the value thereof.

A DFA attack using double fault injection makes it possible to circumvent protection by a method of cryptographic calculation which provides for verification of the calculation by a recalculation and a verification step. An inverse calculation and a verification step may be performed instead.

A summary description of this type of attack is as follows. The successive DESs (where DES DES$^{-1}$ according to the counter-measure implemented) may be logged. This step is done using tools, such as the tracing of current or the electromagnetic radiation of the attacked component.

Disturbances may be generated, for example, with the aid of the laser beam (repeated until enough spoiled digits or bits are obtained to conduct a DFA attack). A first first disturbance a) may be on the penultimate round of the first DES (or the second round of the DES$^{-1}$). A second disturbance b) may be on the penultimate round of the second DES (or the second round of the DES$^{-1}$) with the same disturbance characteristics as in a).

In exploitation, the attacker conducts a DFA attack with the messages collected during the repetition of the second disturbance mentioned above. Disturbances a) and b) need to induce the same effect so that the verification cannot detect the error introduced. This requires that the attacker reproduce the same error, exactly twice, at locations which correspond in the algorithm and in the verification algorithm.

Another type of attack by injections of faults on a register or a storage element is known by the term unidirectional disturbance (Safe Error Attack). Patent application FR No. 10/51205 filed Feb. 19, 2010 in the name of the applicant describes such an attack and a corresponding protection approach.

Other approach to protecting against such an attack is described in patent application FR No. 09/57783 filed on Nov. 4, 2009 and patent application FR No. 08/53198 filed on May 16, 2008.

Another type of attack well known to the person skilled in the art is a side channel attack, known by the term DPA (Differential Power Analysis). Reference may be made to the article by P. Kocher and others entitled Differential Power Analysis.

An approach for protecting oneself against an attack of the DPA type includes performing a random masking of the data path, and in particular, of the SBOX operator present in this data path. Such an approach is, for example, described in European patent no. 1358732.

Currently, it is possible for an attacker to produce at two precise instants the same disturbance which might perhaps foil the counter-measures described in patent application FR No. 09/57783 or in patent application FR No. 08/53198.

Moreover, in spite of the random masking of the SBOX operator described in EP no. 1358732, it is possible for an attacker to conduct a physical attack of the DFA (Differential Fault Analysis) type whether it uses a simple or a double fault.

SUMMARY OF THE INVENTION

According to one mode of implementation, a method of secure cryptographic calculation to protect a component is provided. The method, for example, may be incorporated into a chip card, and implement a redundant cryptographic calculation and a verification against a physical attack of the DFA (Differential Fault Analysis) type. Such an attack uses a double fault to spoil the two calculations in order to obtain information about the secret or private key.

According to another mode of implementation, an embodiment is provided to thwart an attacker who would effect an identical disturbance at two chosen instants. This may be It is advantageous to protect against fault attacks of a "safe error" type without compromising protection from masking by a random quantity necessary to guard against side channel analysis (DPA, DEMA, etc.).

According to one aspect, the method of secure cryptographic calculation may comprise the following:

a formulation of a first list of first random quantities, a formulation of a first non-linear substitution operator (for example, an SBOX operator) masked with the aid of a part at least of the first list;

a formulation of a second list deduced from the first list and comprising second random quantities respectively deduced from the first random quantities;

a formulation of a second non-linear substitution operator masked with the aid of part of at least the second list;

at least two successive implementations of a cryptographic calculation algorithm comprising N rounds of calculation carried out successively to obtain output data on the basis of input data and of a secret key, for example, a preferably symmetric, encryption or decryption algorithm, for example, DES, AES or one of their variations, with the data path of the algorithm being masked;

one of the two implementations comprising a masking of the data path of the algorithm involving the first list of first random quantities and the first masked non-linear substitution operator, with the other implementation comprising a masking of the data path of the algorithm involving the second list of second random quantities and the second masked non-linear substitution operator, and after the two implementations of the algorithm; and a verification of consistency between the two implementations or executions such as, for example, a verification of equality between two data taken from among the data involved in the two implementations.

The data involved may be the input data and the output data of the two implementations. The choice of the data to be verified depends whether the implementation of the algorithm is an encryption or a decryption.

Thus, if the algorithm is applied to plaintext input data, then encrypted output data will be obtained. If the algorithm is applied to encrypted input data, plaintext output data will be obtained.

It is thus possible to perform the two implementations by using the same plaintext input data twice. Thus, for example, the DES is implemented twice. In this case the verification step mentioned above comprises the verification of equality between the two encrypted (enciphered) output data.

It is also possible to perform a first implementation with plaintext input data and the second implementation with the encrypted output data, obtained after the first implementation, as input data. Thus, for example, the DES is implemented the first time and then the $DES^{-1}$. In this case the verification step mentioned above comprises the verification of equality between the input data (plaintext) used during the first implementation and the output data (plaintext: decrypted) obtained on completion of the second implementation.

It is also possible to perform a first implementation with encrypted input data and the second implementation with the plaintext (decrypted) output data, obtained after the first implementation, as input data. Thus, for example, the $DES^{-1}$ is implemented the first time and then the DES. In this case the verification step mentioned above comprises the verification of equality between the (encrypted) input data used during the first implementation and the (encrypted) output data obtained on completion of the second implementation.

It is thus possible to guard against a DFA attack using a double fault. The second random quantities may be deduced from the first random quantities in various ways, for example, through a 1-complement operation, through an incrementation by 1 or else by performing an EXCLUSIVE OR (XOR) of each first random quantity with a constant. These examples are not exhaustive.

According to another aspect, the invention can also be understood as a method of protection within an electronic circuit, of an item of information, for example, a key, in an algorithm, preferably symmetric, for encrypting or decrypting a message (input data) implemented within an electronic component. The method may comprise the following:

a formulation of a first list of first random quantities, a formulation of a first non-linear substitution operator masked with the aid of a part of at least the first list;

a formulation of a second list deduced from the first list and comprising second random quantities respectively deduced from the first random quantities, a formulation of a second non-linear substitution operator masked with the aid of a part of at least the second list;

at least two successive implementations of the algorithm, with the data path of the algorithm being masked, with one of the two implementations comprising a masking of the data path of the algorithm involving the first list of first random quantities and the first masked non-linear substitution operator, and with the other implementation comprising a masking of the data path of the algorithm involving the second list of second random quantities and the second masked non-linear substitution operator; and after the two implementations of the algorithm, a verification of consistency between the two implementations or executions, such as, for example, a verification of equality between two data taken from among the data involved in the two implementations.

According to one mode of implementation compatible with a cryptographic calculation algorithm (encryption or decryption) exhibiting the 1-complement property of DES, such as, for example, the triple DES algorithm or else the algorithms based on a Feistel network, the method furthermore comprises the following:

a random drawing of at least one first bit;

an initial masking of the input data with the aid of the first bit so as to obtain a masked input data;

a masking of the key with the aid of the first bit so as to obtain a masked key;

a first implementation of the algorithm involving the masked input data and the masked key as well as one of the two lists of random quantities and the corresponding masked non-linear substitution operator;

a second implementation of the algorithm involving the masked input data, and the masked key as well as the other list of random quantities and the other masked non-linear substitution operator; and the step of verification of consistency between the two implementations or executions, with verification performed, for example, on two data taken from among the data involved in the two implementations, with the data possibly being data masked by the first bit or else demasked by the first bit.

Such a mode of implementation allows simultaneous protection against several attacks. The choice in the two implementations, of one or the other of the two lists and of the corresponding masked substitution operator can depend on the value of a second randomly drawn bit.

For example, an attacker will no longer be capable of disturbing in a precise and repetitive manner (with the same effects on the registers or the internal logic of the attacked circuit) the two redundant algorithmic instances (for example: DES-DES; DES-DES$^{-1}$; DES$^{-1}$-DES) implemented in the protection, so as to obtain spoiled data (despite the verification performed) exploitable within the framework of DFA. Neither will it be possible any longer for this attacker to apply a "safe-error" to the bits of the key registers.

According to another aspect, an electronic component or circuit comprises means or circuitry adapted for implementing the cryptographic calculation or protection method as defined above. According to yet another aspect, a chip card incorporates such an electronic component or circuit.

BRIEF DESCRIPTION OF THE DRAWINGS

Other advantages and characteristics of the invention will be apparent on examining nonlimiting modes of implementation and embodiments and the appended drawings.

DETAILED DESCRIPTION OF THE PREFERRED EMBODIMENT

Figure 1:
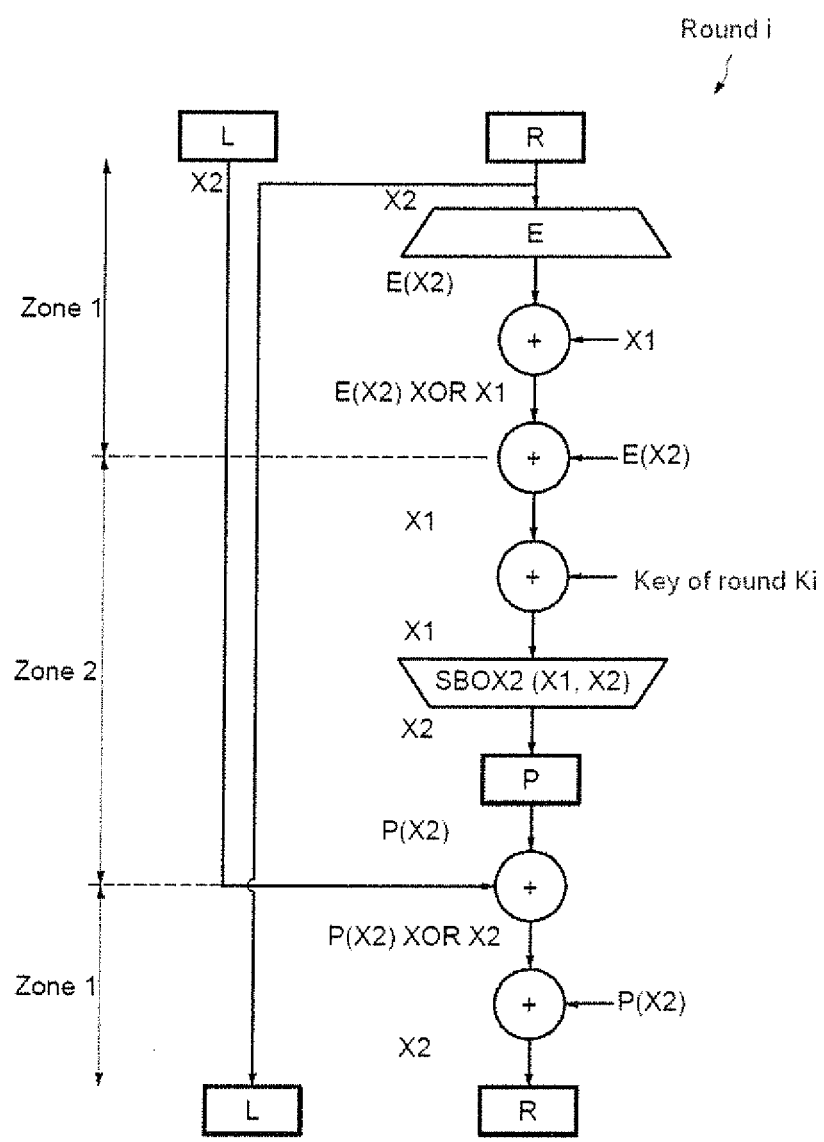
FIG. 1 schematically illustrates an exemplary masked data path of a round of rank i of an algorithm of the DES type according to the invention.

In FIG. 1 the data path is masked by two random numbers X1, X2. E and P are respectively an expansion and a permutation that are commonly used in a known DES algorithm. XOR designates the EXCLUSIVE OR function.

A new non-linear operator SBOX2 is calculated via the relation:

$$SBOX2 = FCT(SBOX, X1, X2)$$

where SBOX is the non-linear operator used in a known DES method, and FCT is a function such that:

$$SBOX2(A\ XOR\ X1) = SBOX(A) XOR\ X2\ \text{for all } A.$$

That said, although FIG. 1 relates to the XOR operator, the latter is not the only possible operator, and the function FCT may be such that SBOX2(A@X1)=SBOX(A)#X2 for all A, in which @ and # are linear mixture operators, where @ and # may differ from one another. These operators can have, in particular, the properties described in EP no. 1358732.

More precisely, if we take for example the operator @, it is chosen linear with respect to the variables that it mixes and exhibits. In general, the following properties may be applicable, regardless of the data A, B, C:

@ is of arity two: it takes two arguments as parameters;
@ satisfies: E(A@B)=E(A)@E(B), with E being a linear operator; and
@ satisfies (A XOR B)@C=A XOR (B@C)

There exists an operator @$^{-1}$, the inverse of @, such that (A@B)@$^{-1}$A=B, where @ and @$^{-1}$ may optionally be identical.

Any other random masking of the data path is possible, in particular, as the one described in EP no. 1358732.

A disturbance undetected by the methods described in patent application FR No. 09/57783 or in patent application FR No. 08/53198 is a disturbance effected in zone 2, as represented in FIG. 1. This benefits from the characteristic that the masks relating to the bits of the flow that are affected by the fault are identical. This may be so when considering a single bit, the probability of such an event is ½. When considering more bits the attacker will have a good probability of obtaining favorable instances with sufficient trials. In other words, wise in this zone 2, the data are identical during the two redundant algorithmic instances.

The attacker's probability of success depends above all on his ability to reproduce the disturbance at the same moment, or at a moment leading to the same effect).

According to one aspect of the invention, a method is provided for which the attacker who undertakes a double injection of faults on a component implementing two redundant algorithmic instances (for example DES DES, or DES DES$^{-1}$, or DES$^{-1}$ DES) will no longer be able to obtain undetected and exploitable disturbances for a DFA attack.

As will be seen in greater detail below, this aspect is distinguished from a first approach that includes in a multiplication of the instances of DES so as to reduce the probability of the attacker producing a multitude of identical faults, or in a choice of a random number of instances (of implementations of the DES).

This aspect of the invention is also distinguished from a second approach which makes provisions to use protection based on random masking by renewing the random quantities between the two instances of DES.

A drawback of the first approach is on the one hand that the performance will be particularly degraded, and on the other hand that the counter-measure does not prevent the attacker from making the attack but renders it more difficult without being able to measure the difficulty scale.

The second approach for its part very slightly reduces the probability of the attacker obtaining pairs in step 2 (disturbances) of the summary description of the double fault DFA attack mentioned above.

Figure 2:
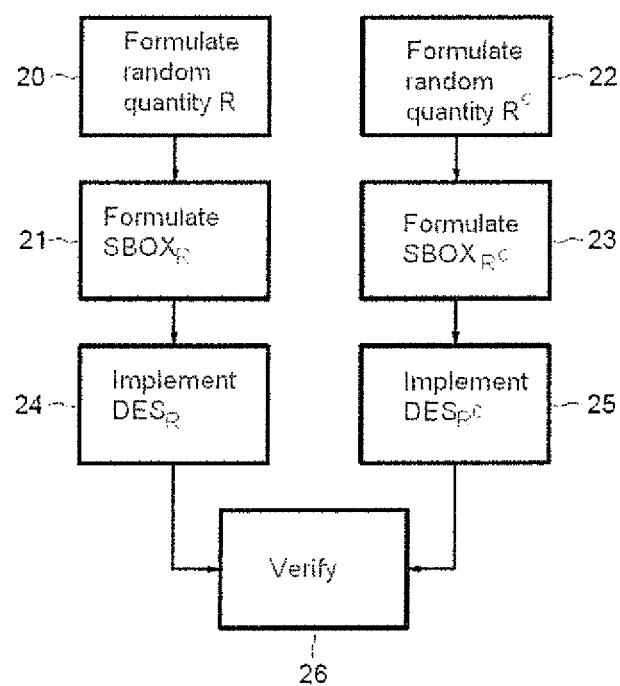
FIGS. 2 to 5 relate to various modes of implementation and embodiment of a method and of a component according to the invention.

Conversely, with this aspect of the invention the protection is "total". More precisely, to guard against a double fault DFA attack, there is a provision according to one mode of implementation (FIG. 2) for the following:

a formulation 20 of a first list of first random quantities R (the random numbers X1, X2 of FIG. 1, or else the random numbers X1, X2, X3 used in EP no. 1358732 are, for example, the first random quantities of the list R);

a formulation 21 of a first non-linear substitution operator SBOX$_R$ masked with the aid of a part of at least the first list;

a formulation 22 of a second list R$^C$, complement of the first list and comprising second random quantities respectively, for example, 1-complements of the first random quantities, (as indicated above the 1-complement is not the only possibility for deducing the second random quantities from the first; it is indeed possible, in particular, to perform an incrementation by 1 or else an EXCLUSIVE OR (XOR) of each first random quantity with a constant);

a formulation 23 of a second non-linear substitution operator SBOX$_R^C$ masked with the aid of a part of at least the second list;

at least two successive implementations of the DES algorithm with the data path masked, for example, according to FIG. 1 or according to EP no. 1358732, with one of the two implementations 24 (DES$_R$) comprising a masking of the data path of the algorithm involving the first list of first random quantities R and the first masked non-linear substitution operator SBOX$_R$;

the other implementation 25 (DES$_R^C$) comprising a masking of the data path of the algorithm involve the second list of second random quantities R$^C$ and the second masked non-linear substitution operator SBOX$_R^C$; and a verification (26) of equality between the two output data respectively obtained on completion of the two implementations of the algorithm. It has in fact been assumed that two encryption instances (DES-DES) have been effected on the same plaintext input data.

Non-equality between the two data signifies that the component has undergone a disturbance. In this case measures, such as a functional disabling of the component, may be taken. An exemplary protocol in accordance with this mode of implementation will now be described.

Random masking of the data flow of a DES implementation makes it possible to protect the DES against attacks of the DPA or DEMA type. More precisely, with this random masking $$C=DES_R(M,K,R,SBOX_R)$$

where, for example, M designates a 64-bit message (input data), K is a 56-bit key encoded on 64 bits, R is the list of first random quantities, C is the result of the encryption of the message M, with the key K and $DES_R$ designating a DES implementation carried out according to a masking method such as that illustrated in FIG. 1 or else described in EP no. 1358732. This involves random quantities of the list R (generally two quantities of size 32 and 48 bits) and a substitution operation $SBOX_R$ (generally a table of 256 bytes) carried out in accordance with the quantities of the list R.

This masking is such that if the quantities of the list R (and consequently $SBOX_R$) are changed at each call to $DES_R$, the implementation obtained is not vulnerable to attacks of the DPA type since the entirety of the flow is masked by the random quantities chosen by internal methods, with these quantities being unknown to the attacker. However, as indicated above, on its own this implementation is vulnerable to a DFA attack.

Hereinafter the following notation is used:
Notation:
0xNN designates hexadecimal notation with 0<N<F (for example, 128 may be written 0x80).

R designates the list of random quantities $r_i$ necessary to carry out $DES_R$.

When a designates a bit, a' designates the 1-complement of a (if a equals 0 the 1-complement equals 1 and vice versa).

Given a list R the notation $R^C$ designates the complement list that is to say, such that for each $r_i$ in R and each $r_i^C$ in $R^C$ we have $r_i^C\hat{}r_i=0xFF \ldots FF$.

$r_i^C$ is therefore here the 1-complement of $r_i$.

For example, it will be possible to construct R and $R^C$ on the basis of a list A of random numbers $a_i$ by taking for R the list of the values $r_i=a_i$, and respectively, for $R^C$ the list of the values $r_i^C=a_i\hat{}0xFF \ldots FF$.

$\hat{}$ designates the bitwise XOR function.

Preferably $r_i$ will be chosen different from 0 and from FF.

The random numbers X1, X2 of FIG. 1, or else the random numbers X1, X2, X3 used in EP no. 1358732 are, for example, the random quantities $r_i$ of the list R.

With the above notation, $DES_R^C$ designates a DES implementation carried out according to a masking method such as illustrated in FIG. 1 or else such as described in EP no. 1358732 involving a list of random quantities $R^C$, while $DES_R$ designates this same DES implementation involving the list of random quantities R.

Thus, $SBOX_R^C$ designates the SBOX values masked according to the list $R^C$ when $SBOX_R$ designates the SBOX values masked according to the list R.

The protocol is as follows:
1. Random drawing of the list A of random numbers $a_i$
2. Construct R and $R^C$ on the basis of A 3. Calculation of $SBOX_R$
4. Calculation of $SBOX_R^C$
5. Verify that $DES_R^C==DES_R$, that is, verify that the two output data respectively obtained by the implementation of $DES_R^C$ and by the implementation of $DES_R$ are equal.

As a variation, it would be possible to reverse the order of steps 3 and 4 or to choose this order as a function of a random draw. As a variation, the calculation of $SBOX_R$ (resp of $SBOX_R^C$) may be done during the execution of $DES_R$ (resp $DES_R^C$).

Figure 3:
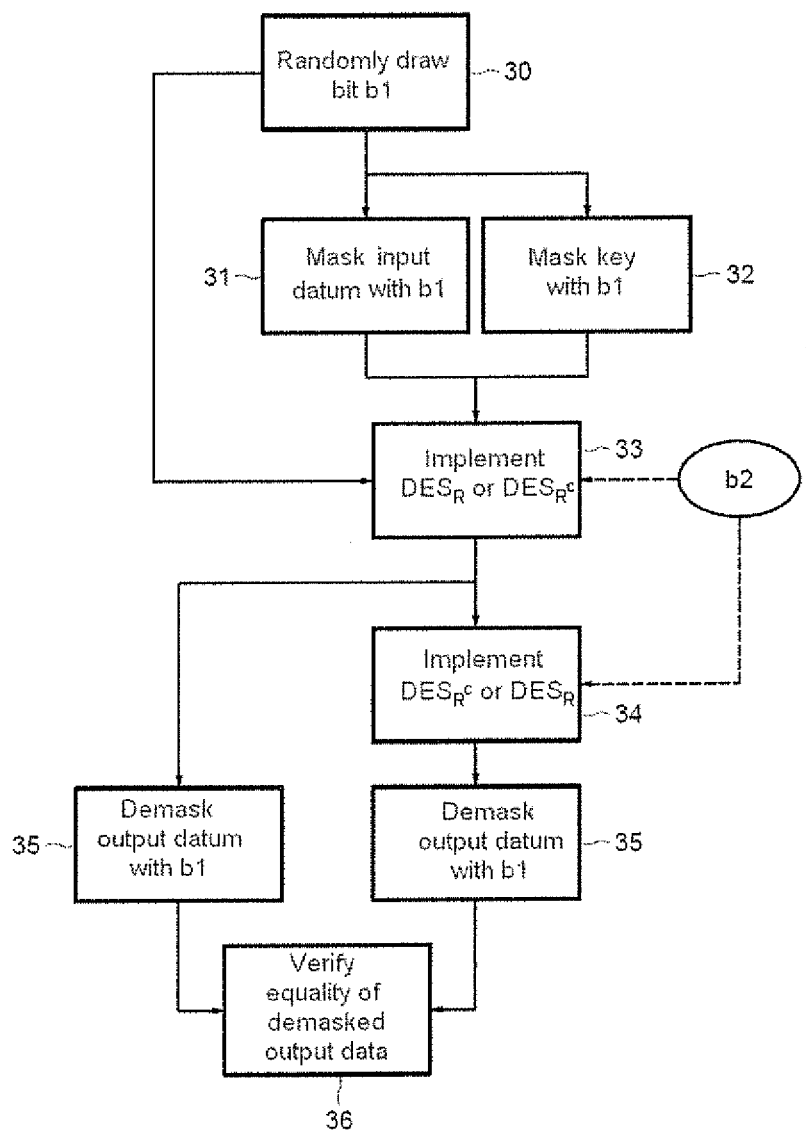

So as to guard at the same time against a double fault DFA attack, and in particular, against an attack of the "safe error" type, there is a provision according to another mode of implementation illustrated in FIG. 3. This method further comprises:

a random drawing 30 of at least one first bit b1;
an initial masking 31 of the input data with the aid of the bit b1 so as to obtain masked input data (complemented with b1);
a masking 32 of the key with the aid of the bit b1 so as to obtain a masked key (complemented with b1; if b1=0 the masked key is the initial key and if b1=1 the masked key is complemented with 1);
a first implementation 33 of the algorithm ($DES_R$ or $DES_R^C$) involving one of the two lists of random quantities, and the corresponding masked non-linear substitution operator;
a second implementation 34 of the algorithm ($DES_R^C$ or $DES_R$) involving the other list of random quantities and the other masked non-linear substitution operator; and
a demasking 35 of each output data with the first bit b1 and a verification 36 on the two demasked output data.

That said, the verification could be performed on the non-demasked data.

It has also been assumed here that two encryption instances (DES-DES) have been effected on the same input data. This other mode of implementation uses a second property which is a property of DES relating to the 1-complement.

More precisely, if C=DES(M,K), then C'=DES(M',K') where C' designates the 1-complement of C and it is then possible to retrieve C via the formula C=(DES(M',K'))', where for all X on 64 bits, X'=0xFFFFFFFFFFFFFFFF$\hat{}$X, where $\hat{}$ designates the bitwise XOR (EXCLUSIVE OR), and M designates the message, and K the DES key coded on 64 bits.

This other mode of implementation harnesses the above two properties so as to thwart an attacker who would effect an identical disturbance at two chosen instants. This is while preserving the properties of protection against fault attacks of "safe error" type and also without compromising the protection from masking by a random quantity necessary to guard against side channel analysis (DPA, DEMA, etc.).

An exemplary protocol will now be described in accordance with this other mode of implementation, furthermore using a second bit b2 (FIG. 3) which will make it possible to choose the alternation of use of $DES_R$ and $DES_R^C$.

The notation above is supplemented with the following notation:
Mask[0]=0x0000000000000000 and Mask[1]= 0xFFFFFFFFFFFFFFFF;
KEY is the key register of the $DEE_R$ implementation (KEY is represented on 64 bits); and
RDATA is the register for data input to and output from the cell which carries out $DES_R$; and
TEMP is a register or memory.

The protocol is as follows:
1. Random drawing of two bits bit b1 and b2 b1 serves to complement the message and the key b2 serves as indicated hereinabove to alternate the use of $DES_R$ and $DES_R^C$
2. Random drawing of the list A of random numbers $a_i$
3. Construct R and $R^C$ on the basis of A
4. Calculation of $SBOX_R$
5. Calculation of $SBOX_R^C$
6. Calculation of M[b1]=M^Mask [b1]
7. Calculation of K[b1]=K^Mask [b1]
8. Loading of KEY with K[b1]
9. Do the sequence Sequence(b1,b2) C[1]=TEMP
10. Do the sequence Sequence(b1,b2') C[2]=TEMP
11. Verification C[1]==C[2]
12. Calculation of C[1]=C[2]^Mask[b1]

In the foregoing Sequence(b1_param, b2_param) applied to the parameters b1_param and b2_param to calculate the content of TEMP is defined by:
a. Loading of M[b1_param] into RDATA
b. f b2_param 1 then execution of $DES_R^C$ otherwise execution of $DES_R$
c. Unloading RDATA into TEMP It is appropriate to point out that the fact that the key is represented on 64 bits, whereas it comprises only 56 is entirely conventional and makes it possible not to distinguish the mask on the key and the mask on the data.

As a variation, the calculation of $SBOX_R$ (resp of $SBOX_R^C$) may be done at 9 and 10 during the execution of $DES_R$ (resp $DES_R^C$).

Moreover, as indicated above, whereas the verification is performed in the above protocol on the data C masked by the bit b1 (complemented with b1), it could also be performed, after demasking by the bit b1 of the masked data, on these demasked data.

It should be noted that in order that the attacker cannot distinguish a masking with b1=0 from a masking with b1=1, steps 6 and 7 are advantageously arranged in such a way that the attacker cannot distinguish the execution with b1=0 from that with b1=1.

Figure 4:
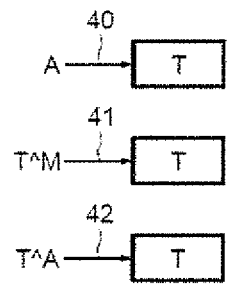
Figure 4:
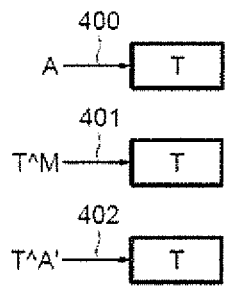

In this regard it will be possible to use any known means such as, for example, an implementation of the type of that illustrated in FIG. 4.
In this figure A is a random byte and A' is its 1-complement.
Calculation of M^0x00
A is stored in a register T (step 40).
T^M is stored in T (A^M is therefore performed) (step 41).
T^A is stored in T (A^M^A is therefore performed which is equal to M) (step 42).
M is therefore stored in T.
Calculation of M^0xFF
A is stored in T (step 400).
T^M is stored in T (A^M is therefore performed) (step 401).
T^A' is stored in T (A^M^A' is therefore performed which is equal to A^M^A^0xFF which is equal to M^0xFF) (step 402).
M^0xFF is therefore stored in T.
Thus, the two calculations of M^0x00 and M^0xFF each comprise substantially the same number of the transitions of bits, hence making it very difficult to discern them.

Moreover, during step b in Sequence(b1_param, b2_param) above, the calculation is effected once with $SBOX_R^C$ (therefore masked according to $R^C$) and another time with $SBOX_R$ (therefore masked according to R), whereas the data and keys are initially masked according to the same mask Mask[b1].

By taking account, for example, of the implementation described in EP no. 1358732 or else of that illustrated in FIG. 1: when b1=1, the execution of the $DES_R^C$ is in zone 1 (FIG. 1) according to a masking corresponding to Mask[1]^$R^C$=R and in zone 2 (FIG. 1) according to a mask corresponding to $R^C$. The execution of the $DES_R$ is in zone 1 (FIG. 1) according to a masking corresponding to Mask[1]^R=$R^C$ and in zone 2 (FIG. 1) according to a mask corresponding to R.

Conversely, when b1=0, the execution of the $DES_R$ is in zone 1 (FIG. 1) according to a masking corresponding to Mask[0]^R=R and in zone 2 (FIG. 1) according to a mask corresponding to Mask[0]^R=R. The execution of the $DES_R^C$ is in zone 1 (FIG. 1) according to a masking corresponding to Mask[0]^$R^C$=$R^C$ and in zone 2 (FIG. 1) according to a mask corresponding to $R^C$.

The following two tables specify the maskings obtained during the execution of the protocol according to b1:

TABLE 1

| | Case b1 = 0 | |
|---|---|---|
| Operation | Masking in Zone 1 | Masking in Zone 2 |
| $DES_R$ (b2 = 0) | R | R |
| $DES_R^c$ (b2 = 1) | $R^c$ | $R^c$ |

TABLE 2

| | Case b1 = 1 | |
|---|---|---|
| Operation | Masking in Zone 1 | Masking in Zone 2 |
| $DES_R$ (b2 = 0) | $R^c$ | R |
| $DES_R^c$ (b2 = 1) | R | $R^c$ |

Thus, the attacker will not be able to obtain a disturbance undetected by the verification of point 11 of the protocol, and the component also benefits from protection against "safe-errors" since the property of alternating representation of the key is adhered to.

Indeed, any modification in the logic which will result from a disturbance during the first instance of the DES and which will modify the data masked according to the first randomly chosen mask, will not be able with an identical effect during the second instance of the DES to modify in the same manner the data masked by the complementary mask.

When the attacker applies his attack to a component implementing a method according to the invention, the latter will obtain a fault detection which depends either on the sequence executed if the disturbance takes place in zone 1 (and not on the key used), or a systematic detection if the disturbance is situated in zone 2. By virtue of these effects the attacker who undertakes an attack of the "safe error" type will obtain faults which are detected and undetected independently of the key bits, thus not allowing him to deduce information about the key k-bits targeted.

It should be noted that the protection can also be implemented with several key registers.

Figure 5:
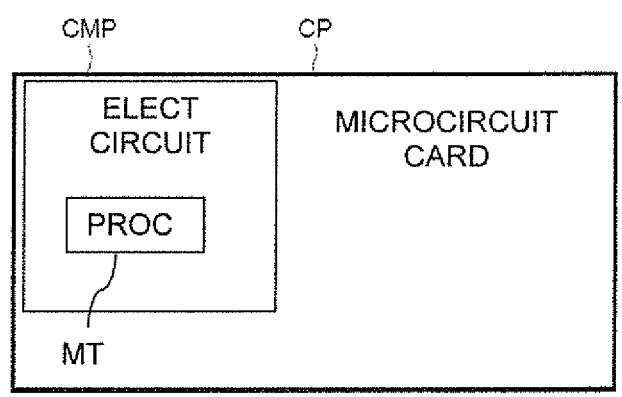

The method according to the invention may be implemented in software within a component CMP or electronic circuit comprising a processor MT (FIG. 5) embodied, for example, by one or more software modules implemented within a microprocessor.

In this regard, according to another aspect of the invention, a computer program product is directly loadable into a memory of a computerized system, for example, the processor and its associated memories. The computer program product comprises portions of software code for the execution of the method, such as defined above when the program is executed on the computerized system.

Yet another aspect is directed to a medium readable by a computerized system that includes computer-executable instructions adapted to cause the execution by the computerized system of the method as defined above.

An electronic circuit may be incorporated into a chip card or microcircuit card CP, for example.

That which is claimed:

1. A method of secure cryptographic calculation comprising:
   operating a processor and a memory associated therewith to perform a secure cryptographic calculation comprising
   formulating a first list comprising first random quantities;
   formulating a first non-linear substitution operator masked with at least part of the first list;
   formulating a second list determined from the first list, and comprising second random quantities respectively determined from the first random quantities;
   formulating a second non-linear substitution operator masked with at least part of the second list;
   at least two successive implementations of a cryptographic calculation algorithm comprising N rounds of calculations carried out successively to obtain output data based on input data and of a secret key, with a data path of the cryptographic calculation algorithm being masked,
   a first of the two successive implementations comprising a masking of the data path of the cryptographic calculation algorithm involving the first list of first random quantities and the masked first non-linear substitution operator, and
   a second of the two successive implementations comprising a masking of the data path of the cryptographic calculation algorithm involving the second list of second random quantities and the masked second non-linear substitution operator; and
   verifying consistency between the two successive implementations.

2. The method according to claim 1, wherein the verifying of the consistency comprises verifying equality between two data taken from data involved in the at least two successive implementations.

3. The method according to claim 1, wherein the second random quantities are obtained by 1-complementing the first random quantities.

4. The method according to claim 1, further comprising:
   a random drawing of at least one first bit (b1);
   an initial masking of the input data with the first bit to obtain masked input data,
   masking the secret key with the first bit to obtain a masked secret key;
   a first implementation of the cryptographic calculation algorithm involving the masked input data and the masked secret key and one of the first or second lists of random quantities and the corresponding masked first or second non-linear substitution operators;
   a second implementation of the cryptographic calculation algorithm involving the masked input data and the masked secret key and the other one of the first or second lists of random quantities and the other one of the corresponding masked first or second non-linear substitution operators; and
   with verifying consistency between the two successive implementations being performed on two data taken from among the data involved in the at least two successive implementations, and with the two data being masked or unmasked by the first bit.

5. The method according to claim 4, further comprising choosing one of the first or second lists of random quantities, and choosing one of the corresponding masked first or second non-linear substitution operators based on a second randomly drawn bit.

6. An electronic component comprising:
   a processor configured to perform a secure cryptographic calculation comprising
   formulating a first list comprising first random quantities,
   formulating a first non-linear substitution operator masked with at least part of the first list,
   formulating a second list determined from the first list, and comprising second random quantities respectively determined from the first random quantities,
   formulating a second non-linear substitution operator masked with at least part of the second list,
   at least two successive implementations of a cryptographic calculation algorithm comprising N rounds of calculations carried out successively to obtain output data based on input data and of a secret key, with a data path of the cryptographic calculation algorithm being masked,
   a first of the two successive implementations comprising a masking of the data path of the cryptographic calculation algorithm involving the first list of first random quantities and the masked first non-linear substitution operator, and
   a second of the two successive implementations comprising a masking of the data path of the cryptographic calculation algorithm involving the second list of second random quantities and the masked second non-linear substitution operator, and
   verifying consistency between the two successive implementations.

7. The electronic component according to claim 6, wherein the verifying of the consistency by said processor comprises verifying equality between two data taken from data involved in the at least two successive implementations.

8. The electronic component according to claim 6, wherein the second random quantities are obtained by 1-complementing the first random quantities.

9. The electronic component according to claim 6, wherein said processor is further configured to perform the following:
   a random drawing of at least one first bit (b1);
   an initial masking of the input data with the first bit to obtain masked input data,
   masking the secret key with the first bit to obtain a masked secret key;
   a first implementation of the cryptographic calculation algorithm involving the masked input data and the masked secret key and one of the first or second lists of random quantities and the corresponding masked first or second non-linear substitution operators;
   a second implementation of the cryptographic calculation algorithm involving the masked input data and the masked secret key and the other one of the first or second lists of random quantities and the other one of the corresponding masked first or second non-linear substitution operators; and
   with verifying consistency between the two successive implementations being performed on two data taken from among the data involved in the at least two successive implementations, and with the two data being masked or unmasked by the first bit.

10. The electronic component according to claim 9, wherein said processor is further configured to choose one of the first or second lists of random quantities, and choose one of the corresponding masked first or second non-linear substitution operators based on a second randomly drawn bit.

11. The electronic component according to claim 6, wherein the electronic component is configured as a chip card.

12. A non-transitory computer-readable medium comprising computer-executable instructions for causing a processor and a memory associated therewith to perform steps comprising:
   formulating a first list comprising first random quantities;
   formulating a first non-linear substitution operator masked with at least part of the first list;
   formulating a second list determined from the first list, and comprising second random quantities respectively determined from the first random quantities;
   formulating a second non-linear substitution operator masked with at least part of the second list;
   at least two successive implementations of a cryptographic calculation algorithm comprising N rounds of calculations carried out successively to obtain output data based on input data and of a secret key, with a data path of the cryptographic calculation algorithm being masked,
   a first of the two successive implementations comprising a masking of the data path of the cryptographic calculation algorithm involving the first list of first random quantities and the masked first non-linear substitution operator, and
   a second of the two successive implementations comprising a masking of the data path of the cryptographic calculation algorithm involving the second list of second random quantities and the masked second non-linear substitution operator; and
   verifying consistency between the two successive implementations.

13. The non-transitory computer-readable medium according to claim 12, wherein the verifying of the consistency comprises verifying equality between two data taken from data involved in the at least two successive implementations.

14. The non-transitory computer-readable medium according to claim 12, wherein the second random quantities are obtained by 1-complementing the first random quantities.

15. The non-transitory computer-readable medium according to claim 12, further comprising computer-executable instructions for execution of the following:
   a random drawing of at least one first bit (b1);
   an initial masking of the input data with the first bit to obtain masked input data, masking the secret key with the first bit to obtain a masked secret key;
   a first implementation of the cryptographic calculation algorithm involving the masked input data and the masked secret key and one of the first or second lists of random quantities and the corresponding masked first or second non-linear substitution operators;
   a second implementation of the cryptographic calculation algorithm involving the masked input data and the masked secret key and the other one of the first or second lists of random quantities and the other one of the corresponding masked first or second non-linear substitution operators; and
   with verifying consistency between the two successive implementations being performed on two data taken from among the data involved in the at least two successive implementations, and with the two data being masked or unmasked by the first bit.

16. The non-transitory computer-readable medium according to claim 15, further comprising software code for execution of the following:
   choosing one of the first or second lists of random quantities, and choosing one of the corresponding masked first or second non-linear substitution operators based on a second randomly drawn bit.

17. An electronic component comprising:
   a processor and a memory associated therewith configured to perform a secure cryptographic calculation comprising
      formulating a first list comprising first random quantities,
      formulating a first non-linear substitution operator masked with at least part of the first list,
      formulating a second list determined from the first list, and comprising second random quantities respectively determined from the first random quantities,
      formulating a second non-linear substitution operator masked with at least part of the second list,
      at least two successive implementations of a cryptographic calculation algorithm comprising N rounds of calculations carried out successively to obtain output data based on input data and of a secret key, with a data path of the cryptographic calculation algorithm being masked,
      a first of the two successive implementations comprising a masking of the data path of the cryptographic calculation algorithm involving the first list of first random quantities and the masked first non-linear substitution operator, and
      a second of the two successive implementations comprising a masking of the data path of the cryptographic calculation algorithm involving the second list of second random quantities and the masked second non-linear substitution operator, and
      verifying consistency between the two successive implementations.

18. The electronic component according to claim 17, wherein the verifying of the consistency by said processor comprises verifying equality between two data taken from data involved in the at least two successive implementations.

19. The electronic component according to claim 17, wherein the second random quantities are obtained by 1-complementing the first random quantities.

20. The electronic component according to claim 17, wherein said processor is further configured to perform the following:
   a random drawing of at least one first bit (b1);
   an initial masking of the input data with the first bit to obtain masked input data,
   masking the secret key with the first bit to obtain a masked secret key;
   a first implementation of the cryptographic calculation algorithm involving the masked input data and the masked secret key and one of the first or second lists of random quantities and the corresponding masked first or second non-linear substitution operators;
   a second implementation of the cryptographic calculation algorithm involving the masked input data and the masked secret key and the other one of the first or second lists of random quantities and the other one of the corresponding masked first or second non-linear substitution operators; and with verifying consistency between the two successive implementations being performed on two data taken from among the data involved in the at least two successive implementations, and with the two data being masked or unmasked by the first bit.

21. The electronic component according to claim 20, wherein said processor is further configured to choose one of the first or second lists of random quantities, and choose one of the corresponding masked first or second non-linear substitution operators based on a second randomly drawn bit.

22. The electronic component according to claim 17, wherein the electronic component is configured as a chip card.

* * * * *